(12) United States Patent
Ruchel

(10) Patent No.: US 7,845,238 B2
(45) Date of Patent: *Dec. 7, 2010

(54) MEASURING DEVICE

(75) Inventor: Johannes Ruchel, Arlesheim (CH)

(73) Assignee: Endress + Hauser Flowtec AG, Reinach (CH)

( * ) Notice: Subject to any disclaimer, the term of this patent is extended or adjusted under 35 U.S.C. 154(b) by 33 days.

This patent is subject to a terminal disclaimer.

(21) Appl. No.: 12/219,976

(22) Filed: Jul. 31, 2008

(65) Prior Publication Data

US 2009/0038409 A1  Feb. 12, 2009

Related U.S. Application Data

(60) Provisional application No. 60/963,689, filed on Aug. 7, 2007.

(30) Foreign Application Priority Data

Aug. 7, 2007  (DE) ........................ 10 2007 037 166

(51) Int. Cl.
*G01F 1/58* (2006.01)

(52) U.S. Cl. .................................... 73/861.12

(58) Field of Classification Search .. 73/861.11–861.16
See application file for complete search history.

(56) References Cited

U.S. PATENT DOCUMENTS

| | | | |
|---|---|---|---|
| 5,735,287 A | 4/1998 | Thomson | |
| 6,475,750 B1 | 11/2002 | Han | |
| 7,523,675 B2 * | 4/2009 | Sulzer et al. ............. | 73/861.12 |
| 2002/0072731 A1 | 6/2002 | Doten | |
| 2007/0027370 A1 | 2/2007 | Brauker | |

FOREIGN PATENT DOCUMENTS

| | | |
|---|---|---|
| DE | 102 10 699 A1 | 9/2003 |
| DE | 103 22 082 A1 | 12/2004 |
| EP | 1 591 487 A1 | 11/2005 |
| WO | WO 93/24810 | 12/1993 |
| WO | WO 01/42744 A2 | 6/2001 |
| WO | WO 2004/109238 | 12/2004 |
| WO | WO 2006/019923 A2 | 2/2006 |

* cited by examiner

*Primary Examiner*—Jewel Thompson
(74) *Attorney, Agent, or Firm*—Bacon & Thomas, PLLC

(57) ABSTRACT

A measuring device, embodied, for example, as an in-line measuring device and/or flow measuring device, serves for registering at least one measured variable of a medium, for example a medium flowing in a pipeline, and is made, at least in part, of a solid, biologically degradable, synthetic material (BDM).

35 Claims, 2 Drawing Sheets

MEASURING DEVICE

CROSS-REFERENCE TO RELATED APPLICATION

This application is a nonprovisional application which claims the benefit of U.S. Provisional Application No. 60/963,689, filed on Aug. 7, 2007 and German Application No. 10 2007 037166.9, which was filed on Aug. 7, 2007.

TECHNICAL FIELD

The invention relates to a measuring device, for example a measuring device embodied as an in-line measuring device and/or a flow measuring device, for registering at least one measured variable of a medium, for example a medium flowing in a pipeline.

BACKGROUND DISCUSSION

In industrial process measurements technology, especially also in connection with the automation of chemical processes or processes adding value to materials, process-near measuring systems are used for registering process-describing, measured variables and for producing measured value signals representing such. These process-near measuring systems are applied directly to, or in, a process line, through which medium is flowing. The measured variables to be registered include, for example, mass- and/or volume flow, e.g. flow rate, flow velocity, density, viscosity, electrical conductivity, temperature, and the like, of a liquid, powdered, vaporous, or gaseous, process medium, which is conveyed, or held, in a process line embodied, for example, as a pipeline.

The measuring systems can be, for example, such wherein in-line measuring devices working with magneto-inductive, measuring transducers or transducers evaluating travel time of ultrasonic waves emitted in the flow direction, especially also those working according to the Doppler principle, are used. Examples developing these ideas further for such measuring systems, examples known per se to those skilled in the art, especially measuring systems formed by means of compact measuring devices, are described in detail in, among others, EP-A 1 039 269, EP-A 984 248, GB-A 21 42 725, U.S. Pat. Nos. 4,308,754, 4,420,983, 4,468,971, 4,524,610, 4,563,904, 4,716,770, 4,768,384, 4,787,252, 5,052,229, 5,052,230, 5,131,279, 5,231,884, 5,531,124, 5,351,554, 5,359,881, 5,458,005, 5,463,905, 5,469,748, 5,540,103, 5,687,100, 5,796,011, 5,808,209, 6,003,384, 6,053,054, 6,031,740, 6,006,609 6,189,389, 6,257,071, 6,293,156, 6,352,000, 6,397,683, 6,330,831, 6,513,393, 6,644,132, 6,651,513, 6,880,410, 6,910,387, US-A 2005/0092101, US-A 2006/0010991, WO-A 88/02 476, WO-A 88/02 853, WO-A 95/16 897, WO-A 00/36 379, WO-A 00/14 485, WO-A 01/02 816, or WO-A 02/086 426.

For registering the respective measured variables, measuring systems of the type discussed here usually include a corresponding measuring transducer, which is, for example, inserted into the course of a process line conveying a medium, or into a wall of a container containing the medium, and serves for producing at least one measurement signal, especially an electrical measurement signal, representing, as accurately as possible, the primarily registered, measured variable. For this, measuring transducers of in-line measuring devices are equipped, for example, with a measuring tube inserted into the course of the relevant process line, such that the medium can be conveyed through the measuring tube. Additionally, measuring transducers of in-line measuring devices are equipped with a corresponding physical-to-electrical sensor arrangement. The sensor arrangement, in turn, includes at least one sensor element reacting primarily to the measured variable to be registered or also to changes of the same, by means of which at least one measurement signal correspondingly influenced by the measured variable is produced. For further processing or evaluating the at least one measurement signal, the measuring transducer is further connected with a measuring electronics correspondingly suited therefor.

The measuring electronics, communicating in suitable manner with the measuring transducer, produces, during operation of the measurement system, with application of the at least one measurement signal, at least at times, at least one measured value instantaneously representing the measured variable, thus, for instance, a mass flow measured value, a volume flow measured value, a density measured value, a viscosity measured value, a pressure measured value, a temperature measured value, or the like.

Commercial flow transducers are usually implemented as pre-fabricated and pre-calibrated components having a carrier tube insertable into the course of the pertinent process line, as well as at least one physical-to-electrical, transducer element appropriately premounted thereon, with the latter, on occasion in conjunction with the carrier tube itself and/or other components of the flow transducer, especially passive-invasive components, such as e.g. flow obstacles protruding into the flow, and/or active components of the flow transducer, such as e.g. magnetic field producing, coil arrangements placed externally on the carrier tube, or sound generating transducers, forming the at least one flow sensor delivering the measurement signal. Widely distributed in industrial measurements technology are, especially, magneto-inductive flow transducers, flow transducers evaluating the travel time of ultrasonic waves coupled into flowing medium, eddy flow transducers, especially vortex flow transducers, flow transducers with oscillating measuring tube, flow transducers evaluating pressure differences, or thermal flow measuring transducers.

By means of in-line measuring devices having a magneto-inductive transducer, for instance, flow velocity and/or volume flow of an electrically conductive, liquid medium flowing through a measuring tube of the measuring transducer in a flow direction can be measured. To this end, there is produced in the magneto-inductive transducer, by means of diametrally opposed field coils of a magnetic circuit arrangement electrically connected to an exciter electronics, a magnetic field, which passes through the medium within a predetermined measuring volume at least sectionally perpendicularly to the flow direction and which closes on itself essentially outside of the medium. The measuring tube is made, therefore, usually of non-ferromagnetic material, in order that the magnetic field not be unfavorably affected during measuring. As a result of the movement of the free charge carriers of the medium in the magnetic field, an electric field is produced in the measuring volume according to the magneto-hydrodynamic principle. The electric field extends perpendicularly to the magnetic field and perpendicularly to the flow direction of the medium. By means of at least two measuring electrodes arranged spaced from one another in the direction of the electric field and by means of an evaluating electronics of the in-line measuring device connected to the measuring electrodes, an electric voltage induced in the flowing medium is then measurable and, in turn, provides a measure for the volume flow. Measuring electrodes, for example, either galvanic electrodes contacting the medium or capacitive electrodes not contacting the medium, can serve for sensing the induced voltage. For conveying and coupling of the magnetic field into the measuring volume, the magnetic circuit arrangement usually includes coil cores surrounded by the field coils and spaced from one another along a periphery of the measuring tube, especially diametrally spaced, and, having free, terminal faces arranged with respect to one another, especially as if they are mirror images of one another. During operation, thus, the magnetic field produced by means of the field coils connected to the exciter electronics is coupled via the coil cores into the measuring tube in such a manner that the magnetic field passes through the medium flowing between the two terminal faces at least sectionally perpendicularly to the flow direction. In addition to volume flow, or flow velocity, also the electrical conductivity of the fluid can be determined by means of modern in-line measuring devices equipped with a magneto-inductive transducer. As an alternative to in-line measuring devices with magneto-inductive measuring transducers, often also in-line measuring devices measuring acoustically by means of ultrasound are used for measuring flow velocities and/or volume flows of flowing media.

Basic construction and functioning of magneto-inductive flow transducers are disclosed e.g. in EP-A 1 039 269, U.S. Pat. Nos. 6,031,740, 5,540,103, 5,351,554, 4,563,904, while the same for ultrasonic flow transducers is disclosed e.g. in U.S. Pat. Nos. 6,397,683, 6,330,831, 6,293,156, 6,189,389, 5,531,124, 5,463,905, 5,131,279, 4,787,252. Since also the others of the above mentioned measuring principles usually employed in industrial flow measuring transducers are likewise sufficiently know to those skilled in the art, further detailing of these as well as also other principles of measurement established in industrial measurements technology and implemented by means of flow measuring transducers is not necessary.

Due to the high integrity as well as form-stability required for such measuring tubes, they are made, both in the case of measuring transducers measuring magneto-inductively as well as also acoustically or, on occasion, also in the case of measuring transducers working according to other principles of measurement, most often of an outer support tube, especially a metal support tube, of predeterminable strength and size, lined internally with an electrically non-conductive, insulating material of predeterminable thickness, the so-called liner. For example, in U.S. Pat. Nos. 6,595,069, 5,664,315, 5,280,727, 4,679,442, 4,253,340, 3,213,685 or JP-Y 53-51 181, in each case, magneto-inductive measuring transducers are described, which include a measuring tube which can be joined fluid-tightly into the course of a pipeline. The measuring tube has an inlet-side, first end and an outlet-side, second end and is composed of a non-ferromagnetic support tube as the outer jacket of the measuring tube, and a tubular liner of an insulating material accommodated in a lumen of the support tube for conveying a flow medium isolated from the support tube.

The liner, which is usually of a thermoplastic, thermosetting or elastomeric, synthetic material, or plastic, serves for chemically isolating the support tube from the medium. In the case of magneto-inductive measuring transducers, in which the support tube has a high electrical conductivity, for example in the case of application of metal support tubes, the liner serves, furthermore, as electrical insulation between the support tube and the medium for preventing a short circuiting of the electric field via the support tube. By a corresponding design of the support tube, as a result, thus a matching of the strength of the measuring tube to the mechanical loading present in the particular application is realizable, while, by means of the liner, a matching of the measuring tube to the chemical and/or biological demands associated with the particular application can be realized.

A special problem of the aforementioned measuring devices is that, among other things, they can, most often, only be disposed of with much difficulty, following their removal from use. This is especially true, because measuring devices of the type discussed here are made, as already mentioned, usually to a considerable extent of synthetic materials. Especially in the case of in-line measuring devices having contact surfaces of plastics for contacting the measured medium mentioned at the start hereof, such as, for example, in-line measuring devices with magneto-inductive measuring transducers, such plastics are, on the one hand, because of the conditions under which they serve in use, made to be inert relative to a large number of chemical compounds, and, as a result, are also, according to the specified use, equally difficultly decomposable chemically. On the other hand, plastics used in conventional measuring devices, especially also as a result of, on occasion, disadvantageous combining with contaminants not directly removable, such as, perhaps resulting from formation of deposits and/or diffusion, must frequently be treated as hazardous waste and are, as a result, only conditionally recyclable or can be destroyed or terminally deposited only with very complicated safety measures.

SUMMARY OF THE INVENTION

An object of the invention is, therefore, to improve measuring devices of the aforementioned type such that a simplified disposal is enabled following their being taken out of use and, as far as possible, also to provide an improved recycling capability of individual measuring device components.

For achieving the object, the invention resides in a measuring device, for example an in-line measuring device and/or a flow measuring device, for registering at least one measured variable of a medium, for example a medium flowing in a pipeline, wherein the measuring device comprises, at least partially, especially one of its components contacted during operation of the measuring device by the measured medium, a solid, biologically, for example photochemically and/or bacteriologically and/or hydrolytically, degradable, synthetic material, BDM.

In a first embodiment of the measuring device of the invention, such further includes a measuring transducer connected with the pipeline, especially one joined into its course, for conveying measured medium and for producing at least one measurement signal corresponding with the measured variable to be registered, especially with changes of the same. Developing this embodiment further, it additionally provided that the measuring transducer, for example at least one if its components contacted during operation of the measuring device by medium being measured, is made at least partially from said biologically degradable synthetic material (BDM).

In a second embodiment of the measuring device of the invention, such further includes a measuring transducer connected with the pipeline, especially one joined into its course, for conveying measured medium and for producing at least one measurement signal corresponding with the measured variable to be registered, especially with changes of the same, wherein the measuring transducer has at least one measuring tube, through which measured medium flows during operation of the in-line measuring device, and wherein the measuring tube is made, at least partially, especially in the region of its inner wall facing its lumen, of said synthetic material (BDM). In a further development of the invention, it is additionally provided that the measuring tube is formed by means of a support tube, especially a rigid and/or metal, support tube, as well as a liner internally lining such. The liner, formed, for example, as a loose liner, especially a liner exchangeable and/or replaceable on-site, can, in such case, be made, at least partially, especially predominantly or exclusively, of said synthetic material (BDM). In an additional further development of this embodiment of the invention, the measuring transducer also includes: A magnetic circuit arrangement arranged on the measuring tube for producing and conveying a magnetic field, which induces an electric field in the flowing medium, especially a medium which is at least slightly electrically conductive; and measuring electrodes for tapping electric voltages induced in the flowing medium.

In a third embodiment of the measuring device of the invention, it is provided that said synthetic material (BDM) is compostable, at least in granular form.

In a fourth embodiment of the measuring device of the invention, it is provided that said synthetic material (BDM) is decomposable by microorganisms, especially bacteria, molds, yeasts or algae and/or at least partially resorbable, especially in association with the production of burnable gas.

In a fifth embodiment of the measuring device of the invention, it is provided that said synthetic material (BDM) is applicable, especially in an originally uncontaminated state and/or ground, as feed and/or feed additive.

In a sixth embodiment of the measuring device of the invention, it is provided that said synthetic material (BDM) is biologically degradable, at least in such a manner that it satisfies European Standard EN 13432:2000.

In a seventh embodiment of the measuring device of the invention, it is provided that said synthetic material (BDM) is biologically degradable, at least in such a manner that it is decomposed, especially under the environmental conditions defined in European Standard EN 14046:2003, within a time period of less than 12 months, especially at most 6 months, at least to an extend of 50%, especially to more than 90%, of a nominal starting mass.

In an eighth embodiment of the measuring device of the invention, it is provided that said synthetic material (BDM) is manufactured on the basis of replenishable raw materials.

In a ninth embodiment of the measuring device of the invention, it is provided that said synthetic material (BDM) is manufactured on the basis of natural latex.

In a tenth embodiment of the measuring device of the invention, it is provided that said synthetic material (BDM) is manufactured on the basis of plant and/or animal fats, especially polyhydroxy fatty acids, lard, tallow or the like.

In an eleventh embodiment of the measuring device of the invention, it is provided that said synthetic material (BDM) is manufactured on the basis of carbohydrates, especially polysaccharides. In such case, said synthetic material (BDM) can be made at least partially of starch and/or cellulose and/or cellulose esters of aliphatic carboxylic acids and/or hemicellulose and/or pectin. Especially, in this embodiment of the invention, it is provided that said synthetic material (BDM) is made at least partially of cellulose acetate and/or cellulose propionate and/or cellulose acetobutyrate and/or celluloid and/or vulcanized fiber.

In a twelfth embodiment of the measuring device of the invention, it is provided that said synthetic material (BDM) is manufactured with application of natural fibers, especially cotton fibers (linters), flax fibers, hemp fibers, wood-chips and/or -meal or -flour, animal wool, silk threads or the like.

In a thirteenth embodiment of the measuring device of the invention, it is provided that said synthetic material (BDM) is manufactured on the basis of amino acids, especially natural amino acids, especially aspartic or asparaginic acid, glutamic or glutaminic acid or the like.

In a fourteenth embodiment of the measuring device of the invention, it is provided that said synthetic material (BDM) is manufactured on the basis of proteins, especially natural proteins, especially containing casein, alanine, arginine, asparagine, cysteine, glutamine, glycine or the like.

In a fifteenth embodiment of the measuring device of the invention, it is provided that said synthetic material (BDM) is manufactured on the basis of lactic acid, for example, thus, at least partially of polylactides.

In a sixteenth embodiment of the measuring device of the invention, it is provided that said synthetic material (BDM) is manufactured on the basis of gelatin.

In a seventeenth embodiment of the measuring device of the invention, it is provided that said synthetic material (BDM) is embodied thermoplastically, thermosettingly or as an elastomer.

Further, the measuring device of the invention is provided, in a further development of the invention, for measuring at least one measured variable, especially a flow and/or a flow velocity, of water, especially drinking water, flowing in a pipeline, or of a food- or pharmaceutical-substance flowing in a pipeline, or a raw material serving for manufacture thereof.

A basic idea of the invention is, for the manufacture of measuring devices of the type being discussed, to replace conventionally used synthetic materials at least partially, especially also predominantly or completely, with synthetic materials classified as biologically degradable. Moreover, by the application of such synthetic materials, it is even possible also to develop new applications in the field of industrial measuring device technology.

Biologically degradable, synthetic materials (BDM), especially in the context of European Industrial Standard EN 13432:2000 or also US-American Standards ASTM D6400 or ASTM D6868, are materials, most often polymeric materials, in the case of which a significant change of the chemical structure of the starting material can be demonstrably brought about by photochemical, hydrolytic and/or microbiological conversion processes. In the chemical-biological conversion processes taking place in such case, the molecular chains of these synthetic materials are split, for example under the action of sun- or UV-light and/or water and/or microorganisms, such as e.g. bacteria, yeasts, molds or algae, and, to the extent possible, converted to toxicologically harmless carbon dioxide, water and methane. Consequently, BDM can, also in the course of an organic recycling, for example in an industrial composting plant, or in the course of a winning of fuel, for example in a biogas plant, be converted to ecologically largely harmless and/or usable, residual materials. Furthermore, such residual materials, or also such synthetic materials (BDM), largely freed of possible contamination, can be further processed, as demanded, also to feed, or feed additives.

In order that synthetic material, for example also material covered by the aforementioned European Standard EN 13432:2000, can be considered to be biologically degradable, synthetic material (BDM), the corresponding conversion- and decomposition-processes should not last more than about one year. For products, which, additionally, can be considered to be compostable, the time for degradation must not exceed the duration of usual composting processes. BDM certification according to the pertinent standards is done in the USA, for example, by the Biodegradable Products Institute (BPI), New York.

Polyesters based on lactic acid form a group of biodegradable plastics suitable for application in measuring devices.

Such polymers exhibit, in comparison to other degradable polymers, only a slight hygroscopicity and can, additionally, degrade hydrolytically.

Also found to be especially suited in the above sense for biological degradation are, additionally, also synthetic materials manufactured completely or at least predominantly on the basis of replenishable, or renewable, raw materials, i.e. so-called bioplastics. Bioplastics are, in such case, those, which, especially without using petroleum products, are produced in predominant fractions or completely of biopolymers, and are suitably modified, especially also with application of processes usual for plastics. Using particular methods and with addition of processing aids, such bioplastics, for instance cellulose acetate, can even be given thermoplastic properties.

Applicable as starting materials for manufacture of bioplastics are, for instance, agricultural raw materials, such as plant-oil or -fats, starch, sugar or other polysaccharides or, for example, also cellulose, monomeric carbohydrates, chitin, animal fats or oils, as well as also proteins. Obtainable therefrom are, for example, aliphatic polyesters, cellulose materials, or starch materials based on virgin plant-starch, such as also proposed in U.S. Pat. Nos. 5,362,777, 6,096,809, 6,472,497 or 6,565,640.

Apart from the fact that, in the case of many bioplastics, such are most often also biodegradable, synthetic materials (BDM), these materials can often also be produced based on rapidly regrowing, agricultural sources of raw material and, as a result, can also be produced largely climate-neutrally. Examples of agricultural sources of raw material include, for example, land- or forest-planted, even gene-manipulated, crops, such as e.g. correspondingly designed canola varieties, and special types of grains or grasses. Moreover, also, for example, rapidly growing varieties of trees, e.g. eucalyptus, or residues from food- or feed-processing, such as tomato- and potato-skins, beet molasses, or crab- and shrimp-shells, can serve as sources of raw material for BDM. Furthermore, also such animal products as e.g. sheared wool, leather and skins, lard, tallow, gelatin and casein, or a waste product referred to as cotton linters, which remains from the cotton boll following removal of the cotton fibers, or also other organic residues, such as straw, wood-fibers or -chips, can be applied for the manufacture of BDM.

Besides the biodegradability and their regenerative raw material basis, bioplastics possess, additionally, also, natural properties or properties induced by upgrading, such as e.g. vapor deposition with aluminum or silicon dioxide, which make them stand out as compared with conventional synthetic materials, e.g. as regards surface character or barrier properties of the material against diffusion of fluid media. Moreover, BDM, especially also those based on bioplastics, exhibit mechanical properties also quite comparable with typical thermoplastics and can thus be worked even by means of conventional technologies, such as e.g. extrusion, blow forming or injection molding, such as have become established in the production of conventional plastics products.

Although BDM are frequently manufactured of bioplastics, it should not be left unmentioned, that there are, however, also particular petroleum-based, synthetic materials, which are very well biodegradable and, thus, can equally be viewed as BDM.

BRIEF DESCRIPTION OF THE DRAWINGS

The invention and advantageous embodiments will now be explained in greater detail on the basis of the figures of the drawing. Equal parts are, in such case, uniformly provided with equal reference characters. In case helpful for clarity, reference characters in subsequent figures may, as well, be omitted.

The figures show as follows.

DETAILED DISCUSSION

Figure 1:
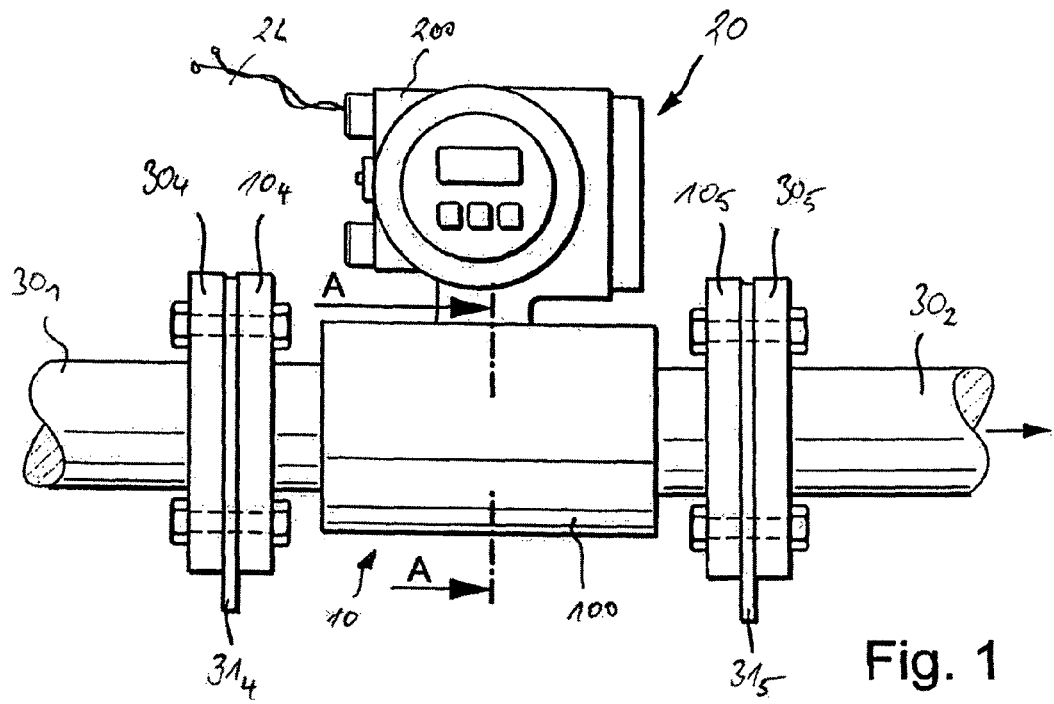
FIG. 1 in schematic presentation, an example of an embodiment of the measuring device of the invention, the measuring device including a measuring tube inserted into the course of a pipeline.
Figure 2:
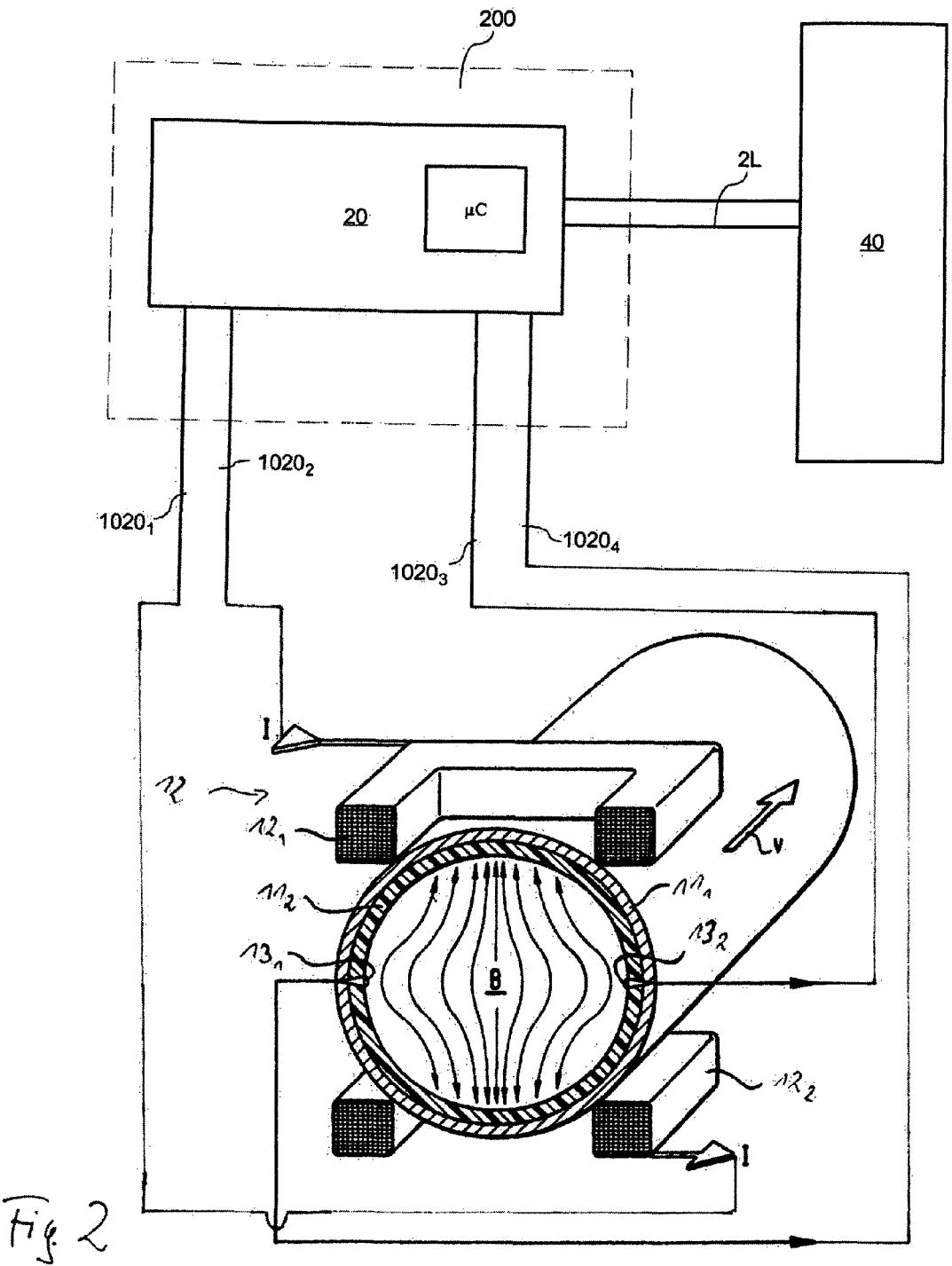
FIG. 2 schematically, a measuring device of FIG. 1, showing its measuring tube in cross section according to the cutting plane A-A of FIG. 1.

Shown schematically in two views in FIGS. 1 and 2 is a measuring device suitable for application in industrial measurements and automation technology and serving for registering at least one measured variable of a medium, especially a medium flowing in a pipeline. The measuring device, which is shown here as an in-line measuring device for insertion into the course of a pipeline conveying medium to be measured, can be, for example, a flow measuring device, which measures flows, especially flow rates and/or flow velocities, of flowing media acoustically based on ultrasound and/or on the basis of vortices induced in the medium, or, as shown by way of example in FIGS. 1 and 2, on the basis of voltages induced in the medium. Alternatively thereto or in supplementation thereof, the measuring device can, however, also be embodied as a measuring device suited for measuring other measured variables of interest in measurements- and automation-technology, such as e.g. a pressure, a temperature, a density, a viscosity, etc. Especially, the measuring device, particularly one embodied as an in-line measuring device and/or a flow measuring device, is additionally suitable for measuring media in drinking water networks, in pharmacy or in food-manufacture and/or -processing, for example also for flow measurement of food- or pharmaceutical-raw-materials or water flowing in a pipeline system.

The measuring device includes: A measuring transducer 10 (in the example of an embodiment shown here, a transducer inserted into the course of a pipeline whose sections, $30_1$, $30_2$, respectively, supply and carry away the medium) for producing measurement signals corresponding with the at least measured variable to be registered; as well as an electronics housing 200, for example, secured directly to the measuring transducer 10, in which is accommodated a measuring device electronics 20 electrically coupled with the measuring transducer 10 for controlling the measuring device during operation as well as for processing measurement signals delivered by the measuring transducer. A microcomputer µC provided in the measuring device electronics 20 can serve for controlling the measuring device as well as for processing measurement signals delivered by the measuring transducer 10. Measuring device electronics 20 can, additionally, be connected via connecting lines 2L with a superordinated, electronic data processing system 40. Via the connecting lines 2L, on the one hand, measuring device and data processing system exchange measurement- and operating-data generated during operation, such as, for instance, the digitized, measured values representing the registered measured variable, digital operating- and diagnostic-data and/or parametering- or control-commands entering into the operation of the measuring device, and, on the other hand, the feeding of the measuring device with the electrical power required for the operation is effected.

Figure 3:
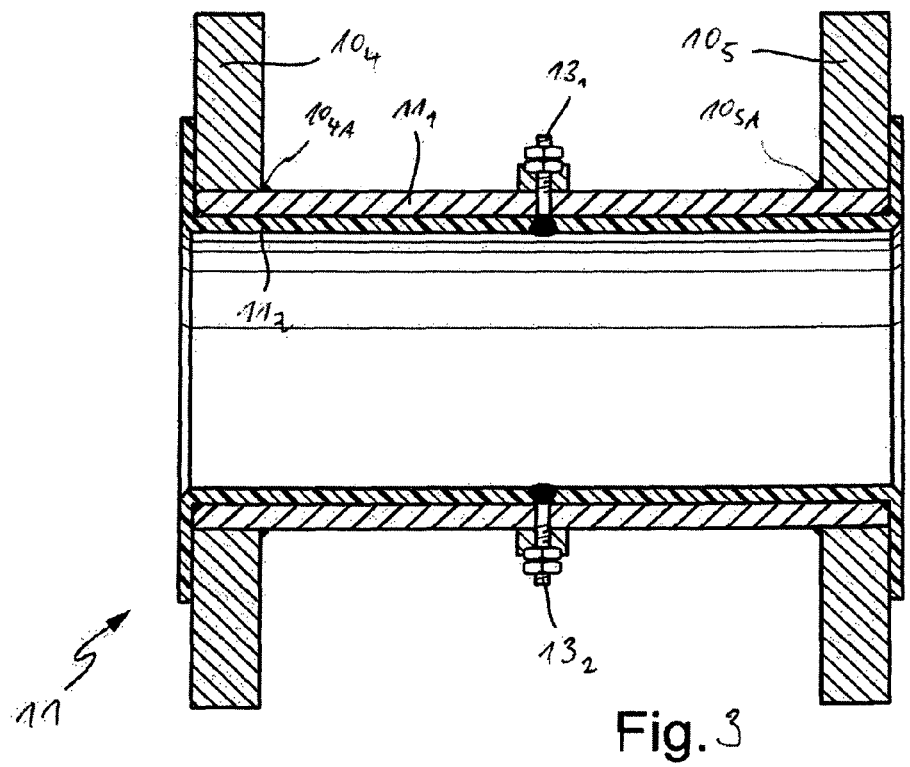
FIG. 3 schematically in a longitudinal section, a measuring tube for a measuring device of FIGS. 1 and 2.

For conveying medium to be measured, as well as also for supporting components producing the measurement signal, components such as e.g. physical-to-electrical transducer elements serving as signal generators, the measuring transducer includes further a measuring tube 11, which may be arranged within a transducer housing 100 serving as outer protective jacket. A suitable structural construction of a measuring tube 11 is shown by way of example in the combined FIGS. 2 and 3.

In the case of the measuring transducer shown in the example of an embodiment, at each of the two end regions of the measuring transducer 10 formed, in each case, by one of the measuring tube ends, in each case, a transducer flange $10_4$, $10_5$ is provided to serve for connecting the measuring device to the pipeline. The flanges can, in such case, be pushed, for example, onto the measuring tube 11 and welded thereto. Each of the two transducer flanges $10_4$, $10_5$ is, as schematically illustrated, assembled with, in each case, a pipeline flange $30_4$, $30_5$ provided on a corresponding end region of the pipeline $30_1$, $30_2$, respectively. Between a transducer flange $10_4$, $10_5$ and the, in each case, corresponding pipeline flange $30_4$, $30_5$, it is possible, if required, to provide, additionally, in each case, a gasket $31_4$, $31_5$, respectively, of synthetic material serving for sealing and/or grounding the measuring device.

The measuring tube 11 shown here is formed by means of a support tube $11_1$, especially a rigid and/or metal support tube, of predeterminable lumen and a tubular liner $11_2$ of isolating material and of predeterminable size. The support tube made at least predominantly of mechanically and/or thermally, highly loadable material, for instance industrial-grade plastic, ceramic, stainless steel or some other stainless metal, surrounds, in such case, the liner $11_2$ coaxially, so that the liner completely lines the support tube $11_1$ internally and, as a result, the support tube is, for practical purposes completely isolated from the medium flowing through during operation. Additionally, also the already mentioned transducer flanges $10_4$, $10_5$ are mounted on the support tube $11_1$. The liner $11_1$ can be made, for example, of a plastic applied onto the inner wall of the support tube in a centrifugal-, injection molding-, pressure molding-, or extruder-method. Alternatively thereto or in supplementation thereof, liner $11_2$ can, however, also be introduced into the support tube $11_1$ as a prefabricated, insertable mat or as a prefabricated, pulled-in tube. Especially in the latter case, it is, additionally, also directly possible to provide the liner $11_2$, as proposed, among other things, also in US-A 2006/0010991, on occasion even as a loose liner, thus a liner extending loosely in the support tube, exchangeable and/or on-site replaceable.

In an embodiment of the invention, the measuring transducer and, as a result, also the measuring tube, are provided for application in an in-line measuring device measuring the measured variable magneto-inductively. Accordingly, the measuring transducer further includes: A magnet system 12 arranged on the measuring tube for producing and conveying a magnetic field B, which induces in the flowing medium, here in the form of an at least slightly electrically conductive liquid, an electric voltage; as well as measuring electrodes $13_1$, $13_2$, for tapping voltages induced in the flowing medium. The measuring electrodes $13_1$, $13_2$ are placed lying opposite to one another, especially diametrally opposite, on the measuring tube 11. Of course, the measuring electrodes $13_1$, $13_2$ can, in case required, especially in the case of application of more than two measuring electrodes, be so arranged spaced from one another on the measuring tube 11, that they lie not diametrically opposite. This can be the case e.g. when additional measuring electrodes are provided for reference potentials or other measuring electrodes for monitoring a minimum fill level of medium in the measuring tube 11, in the case of horizontal, installed position of the same. In the example of an embodiment shown here, the measuring electrodes $13_1$, $13_2$ are, additionally, embodied as galvanic electrodes contacting the medium during operation; however, the measuring electrodes can, as quite common in the case of such measuring transducers, also be embodied as capacitive electrodes coupling the induced voltage out through a dielectric.

The magnet system 12, in turn, includes, as quite usual in the case of industrial-grade, magneto-inductive measuring devices, two field coils $12_1$, $12_2$, which are likewise placed lying opposite to one another, especially diametrically opposite, on the measuring tube 11. In such case, the two field coils $12_1$, $12_2$ are so arranged in advantageous manner that a chord, especially a diameter, of the measuring tube 11 imaginarily connecting the field coils $12_1$, $12_2$ extends perpendicularly to a chord of the measuring tube 11, especially a diameter of the measuring tube 11, equally imaginarily connecting the measuring electrodes $13_1$, $13_2$.

The field coils $12_1$, $12_2$ are, furthermore, at least during measuring operation, connected via connecting lines $1020_1$, $1020_2$ with a driver circuit of the in-line measuring device (not shown here in detail) provided in the measuring electronics 20 and serving for producing changing electrical currents of predeterminable current strength. At least at times, a corresponding exciter current I flows through the field coils $12_1$, $12_2$.

The magnetic field B produced during operation by means of the magnetic field system, through which current is flowing, passes through the medium flowing within the measuring tube 11 at least sectionally perpendicularly to its flow direction. Under the influence of the magnetic field B, mobile charge carriers located in the medium migrate, depending on polarity, to one of the two measuring electrodes $13_1$, $13_2$. For tapping the voltage correspondingly induced in the flowing medium, the measuring electrodes $13_1$, $13_2$ are connected by means of connecting lines $1020_3$, $1020_4$ to the measuring device electronics 20 in a manner suitable for the measuring.

In the manufacture of the measuring tube 11 itself, first the, for example metal, support tube $11_1$ is provided with a desired length. Then, on each end of the support tube 11, in each case, one of the transducer flanges $10_4$, $10_5$, for example likewise metal, is pushed onto the respective end of the support tube $11_1$. Following this, the rear side of each transducer flange $10_4$, $10_5$ is mechanically securely and tightly connected with the outside of the support tube $11_1$. In the case where support tube and transducer flange are both metal, this can happen, for example, by soldering, brazing or welding, this leading to a corresponding soldered, brazed or welded seam $10_{4A}$, $10_{5A}$. The intermediate space bounded by the transducer flanges $10_4$, $10_5$ and the support tube $11_1$ can, as quite usual in the case of magneto-inductive measuring transducers, be closed by means of a surrounding piece of sheet metal. The intermediate space can, in the case where the measuring tube is used for a magneto-inductive measuring transducer, serve, for example, for accommodating the field coils producing the mentioned magnetic field and for accommodating further components of the mentioned magnet system. When the piece of sheet metal is to serve, in such case, as a part of the magnetic system, it can then, advantageously, also be ferromagnetic.

In the case of the measuring device of the invention, it (for example one or more of its components, which are contacted, during operation of the measuring device, by medium to be measured) is, in particular, provided that it is made, at least in part, of a solid, biologically, for example photochemically and/or bacteriologically and/or hydrolytically, degradable, synthetic material—BDM for short. The BDM can be, for example, a thermoplastic, or a thermosetting, plastic. Alternatively or in supplementation, the BDM used for the measuring device of the invention can, however, also be embodied as an elastomer. Serving as basis for the BDM applied in the measuring device can be, for example, proteins and/or amino acids and/or fats and/or oils.

In an embodiment of the invention, a synthetic material is selected as BDM, which is also decomposable by microorganisms, such as, for example, bacteria, molds, yeasts or algae, and which is at least partially resorbable, in circumstances, also in association with the production of burnable gases. Especially serving, in such case, as BDM is a synthetic material, which is compostable, at least in granular form, and/or which, at least in an original, uncontaminated state and/or sufficiently comminuted, especially crushed or ground, is applicable as feed and/or feed additive.

In a further embodiment of the invention, it is provided that the BDM is at least biologically degradable in such a manner that it meets the minimum requirements placed on biologically degradable plastics according to at least one of the standards EN 13432:2000, ASTM D6400 or ASTM D6868.

In a further embodiment of the invention, additionally selected as BDM for the measuring device is a synthetic material, which at least is biologically degradable in a manner such that it is, for example under the environmental conditions defined in European Standard EN 14046:2003 and/or US-American Standard ASTM D5338, decomposed within a time period of less than 12 months, especially at most 6 months, at least to an extent of 50%, especially more than 90%, of a nominal starting mass.

In another embodiment of the invention, the BDM applied for the measuring device of the invention is at least partly manufactured on the basis of replenishable raw materials. The BDM applied for the measuring device of the invention can, in such case, be, for example, of the following synthetic materials, or synthetic material families, as the case may be, singly or also in combination: Synthetic materials based on natural latex; synthetic materials based on plant and/or animal fats, such as, for instance, polyhydroxy fatty acids, lard, tallow or the like; synthetic materials based on natural fibers, such as cotton fibers (linters), flax fibers, hemp fibers, woodchips and/or -meal or -flour, animal wool, silk fibers or the like; synthetic materials based on natural amino acids, such as, for instance, asparaginic acid, glutaminic acid or the like; synthetic materials based on natural proteins, such as, for instance, those containing casein, alanine, arginine, asparagine, cysteine, glutamine, glycine or the like; synthetic materials based on gelatin; synthetic materials based on carbohydrates, especially polysaccharides; as well as also synthetic materials based on lactic acid. Such BDM manufactured on the basis of replensihable raw materials and suitable for the measuring device of the invention can be e.g. polylactide, starch, cellulose, cellulose esters of aliphatic carboxylic acids, hemicellulose, as well as also pectin. Synthetic material based on cellulose especially suitable for application as BDM in the measuring device of the invention are, for example, cellulose acetate, cellulose propionate, cellulose acetobutyrate, celluloid, as well as also vulcanized fiber.

For the above described case in which the measuring device includes a measuring transducer 10 connected with the pipeline $30_1$, $30_2$, especially a transducer inserted into the course of the pipeline, for conveying medium to be measured and for producing at least one measurement signal corresponding with the measured variable to be registered, especially also with changes of the same, it is further provided, in an additional embodiment of the invention, that the measuring transducer 10 is made at least partly of this biologically degradable, synthetic material (BDM). For example, in such case, one of its components contacted during operation of the measuring device by medium to be measured can be formed by means of the BDM. In a further embodiment of the invention, for the case in which the measuring transducer 10 includes at least one measuring tube, through which the medium to be measured flows during operation of the measuring device, it is further provided that the measuring tube 11 is made at least partly of said BDM, e.g. in the region of an inner wall facing its lumen. Especially for the case in which the measuring tube 11 is, as mentioned, formed by means of a support tube $11_1$, as well as a liner $11_2$ lining such internally, at least the liner $11_2$ is at least partially, on occasion predominantly or even exclusively, made of such a BDM.

Alternatively to or in supplementation of application of a liner $11_2$ of BDM, also other components of the measuring device, such as e.g. parts of the electronics housing 200, cable insulations of connecting lines, potting compounds used for cable feedthroughs and/or for embedding electronic components, possibly used sealing and/or grounding gaskets, or other installed parts protruding into the medium during operation, or also other supporting parts or also other form-giving and/or stabilizing components of measuring transducers, such as e.g. the aforementioned support tube $11_1$ and/or also transducer housing 200 serving as outer jacket of measuring transducers, etc., can be made, at least partially, of such a BDM. This holds, especially, also in the case of measuring devices, which differ from the measuring device shown in FIGS. 1 and 2 as regards the involved principle of measurement and/or measuring transducer type, for example, thus, also ultrasonic flow measuring devices, vortex measuring devices, pressure-difference measuring devices, Coriolis mass flow meters, thermal flow meters, etc.

At least for the already mentioned case, in which the measuring device of the invention serves for measuring media, which are themselves subjected to increased requirements as regards chemical-biological, as well as also bacteriological purity, i.e. media such as e.g. drinking water, food or pharmaceuticals, and, as a result, can likewise be classified as toxicologically and/or ecologically quite unharmful, to the extent that components of the measuring device exposed during operation to medium to be measured and made of synthetic material are made of BDM, now the disposal of such components can be implemented under far lesser safety requirements than before. As a result, the invention can contribute a not insignificant addition to protection of the environment and, at least in the case of application of BDM based on rapidly replenishing, natural raw materials, also to climate protection.

The invention claim is:

1. A measuring device for registering at least one measured variable of a medium, wherein the measuring device comprises: a solid, biologically degradable, synthetic material (BDM).

2. The measuring device as claimed in claim 1, further comprising:
   a measuring transducer connected with the pipeline, especially a measuring transducer joined into its course, for conveying measured medium and for producing at least one measurement signal corresponding with the registered, measured variable, especially to changes thereof.

3. The measuring device as claimed in claim 2, wherein:
   said measuring transducer, especially at least one of its components contacted by the measured medium during operation of the measuring device, is comprised, at least in part, of said synthetic material (BDM).

4. A measuring device as claimed in claim 3, wherein:
   said measuring transducer comprises at least one measuring tube, through which measured medium flows during operation of the in-line measuring device; and said measuring tube, especially its inner wall facing its lumen, is comprised, at least in part, of said synthetic material (BDM).

5. The measuring device as claimed in claim 4, wherein: said measuring tube is formed by means of a support tube, especially a rigid and/or metal support tube, as well as a liner lining such internally.

6. The measuring device as claimed in claim 5, wherein: said liner, at least in part, especially predominantly or exclusively, is comprised of said synthetic material (BAW).

7. The measuring device as claimed in claim 6, wherein: said liner is formed as a loose liner, especially an exchangeable liner or a liner replaceable on-site.

8. The measuring device as claimed in claim 2, wherein: said measuring transducer further comprises:
a magnetic circuit arrangement arranged on said measuring tube for producing and conveying a magnetic field inducing in the medium, especially a medium which is at least slightly electrically conductive, an electric field; and
measuring electrodes for tapping electric voltages induced in the flowing medium.

9. The measuring device as claimed in claim 1, wherein: said synthetic material (BDM) is compostable, at least in granular form.

10. The measuring device as claimed in claim 1, wherein: said synthetic material (BDM) is decomposable by microorganisms, especially bacteria, molds, yeasts or algae, and/or is at least partially resorbable, especially in association with production of burnable gas.

11. The measuring device as claimed in claim 1, wherein: said synthetic material (BDM), especially in an original, uncontaminated state and/or ground, is applicable as feed and/or feed additive.

12. The measuring device as claimed in claim 1, wherein: said synthetic material (BDM) is at least biologically degradable in a manner such that it meets European Standard EN 13432:2000.

13. The measuring device as claimed in claim 1, wherein: said synthetic material (BDM) is at least biologically degradable in a manner such that it is decomposed, especially under the environmental conditions defined in European Standard EN 14046:2003, within a time period of less than 12 months, especially within at most 6 months, to an extent of 50%, especially to more than 90%, of a nominal starting mass.

14. The measuring device as claimed in claim 1, wherein: said synthetic material (BDM) is manufactured based on replenishable raw materials.

15. The measuring device as claimed in claim 1, wherein: said synthetic material (BDM) is manufactured based on natural latex.

16. The measuring device as claimed in claim 1, wherein: said synthetic material (BDM) is manufactured based on plant and/or animal fats.

17. The measuring device as claimed in claim 1, wherein: said synthetic material (BDM) is manufactured based on carbohydrates.

18. The measuring device as claimed in claim 17, wherein: said synthetic material (BDM) is made at least partially of a polysaccharide and/or a carbohydrate selected from a group consisting of: starch, cellulose, cellulose ester of aliphatic carboxylic acids, hemicellulose, and pectin.

19. The measuring device as claimed in claim 18, wherein: said synthetic material (BDM) is made at least partially of a carbohydrate selected from a group consisting of: cellulose acetate, cellulose propionate, cellulose acetobutyrate, celluloid, and vulcanized fiber.

20. The measuring device as claimed in claim 1, wherein: said synthetic material (BDM) is manufactured with application of natural fibers.

21. The measuring device as claimed in claim 1, wherein: said synthetic material (BDM) is manufactured based on amino acids.

22. The measuring device as claimed in claim 1, wherein: said synthetic material (BDM) is manufactured based on proteins.

23. The measuring device as claimed in claim 1, wherein: said synthetic material (BDM) is manufactured based on lactic acid.

24. The measuring device as claimed in claim 23, wherein: said synthetic material (BDM) is made at least partially of polylactides.

25. The measuring device as claimed in claim 1, wherein: said synthetic material (BDM) is manufactured based on gelatin.

26. The measuring device as claimed in claim 1, wherein: said synthetic material (BDM) is thermoplastic.

27. The measuring device as claimed in claims 1, wherein: said synthetic material (BDM) is thermosetting.

28. The measuring device as claimed in claim 1, wherein: said synthetic material (BDM) is an elastomer.

29. Use of a measuring device, which comprises: a solid, biologically, degradable, synthetic material (BDM) for measuring at least one measured variable, of a medium flowing in a pipeline and being selected from a group consisting of: water, food, pharmaceutical.

30. The measuring device as claimed in claim 1, wherein: the measuring device is selected from a group consisting of: an in-line measuring device for registering at least one measured variable of a medium flowing in a pipeline and a flow measuring device for registering a flow velocity of a medium flowing in a pipeline.

31. The measuring device as claimed in claim 1, wherein: a component of the measuring device contacted by the measured medium during operation of the measuring device comprises said solid, biologically degradable, synthetic material (BDM).

32. The measuring device as claimed in claim 1, wherein: said solid, biologically degradable, synthetic material (BDM) is selected from a group consisting of: photochemically degradable, synthetic material, and bacteriologically degradable, synthetic material, and hydrolytically degradable, synthetic material.

33. The measuring device as claimed in claim 1, wherein: said synthetic material (BDM) is manufactured with application of natural fibers selected from a group consisting of: cotton fibers, flax fibers, hemp fibers, wood-chips and/or -meal or -flour, animal wool, silk threads.

34. The measuring device as claimed in claim 1, wherein: said synthetic material (BDM) is manufactured based on amino acids selected from a group consisting of: natural amino acids, especially asparaginic acid, and glutaminic acid.

35. The measuring device as claimed in claim 1, wherein: said synthetic material (BDM) is manufactured based on proteins selected from a group consisting of: natural proteins, especially proteins containing casein, alanine, arginine, asparagine, cysteine, glutamine, and glycine.

* * * * *